united States Patent Office
3,132,075
Patented May 5, 1964

3,132,075
SOLID MEDICINAL DOSAGE FORMS COATED WITH HYDROXYETHYLCELLULOSE AND HYDROLYZED STYRENE-MALEIC ANHYDRIDE COPOLYMER
Richard H. Johnson, Kalamazoo, Mich., assignor to The Upjohn Company, Kalamazoo, Mich., a corporation of Delaware
No Drawing. Filed Oct. 17, 1960, Ser. No. 62,863
8 Claims. (Cl. 167—82)

This invention relates to improved coating compositions, the coating process and coated substances, primarily medicinals. More particularly this invention relates to coating compositions which are solutions consisting essentially of hydrolyzed styrene-maleic anhydride copolymer, hydroxyethylcellulose, and a volatile solvent; the process of applying such compositions; and solid substances, usually medicinal tablets, which have been coated with the said compositions.

Solid medicaments for oral administration such as tablets are provided with coatings for a variety of reasons. For example, a coating will serve as a barrier to a disagreeable taste or odor and provide protection against chipping and breaking.

Two types of special coatings have been provided which are intended to resist disintegration in the stomach yet rapidly disintegrate in the intestine. One type is the "time disintegration coating" which requires a long period of time for dissolving, the period of time being about the average length of time that the stomach normally empties its contents. The effectiveness of this coating being dependent upon the tablet passing into the intestine before the coating disintegrates. The second type of coating which is used to protect a tablet during its transit through the stomach is the enteric coating. The enteric coating depends upon pH for its dissolution. Coatings of this type are composed of polymeric materials which are insoluble in the extremely acid pH of the stomach and rapidly dissolve in the slightly acid pH of the intestine. Examples of enteric coatings of this latter type are coatings consisting of cellulose acetate phthalate or hydrolyzed styrene-maleic anhydride copolymer as disclosed in U.S. Patent 2,897,121.

According to the present invention it has been discovered that coating compositions comprising a solution of hydrolyzed styrene-maleic anhydride copolymer and hydroxyethylcellulose in a volatile solvent can be applied to solid medicinal dosage forms to provide a coating that rapidly dissolves independent of the pH of the media in which it is surrounded. Although this does not provide an enteric coat as would be expected, the compositions are useful for the coating of solids when it is desirable for the coating to disintegrate rapidly. The coating compositions are easily applied by the conventional methods, i.e., by means of a tablet coating pan, and can also be applied by the newer air suspension method. The compositions deposit a uniform layer of coating about the surface being coated. The coating compositions can be used to coat not only solid material such as tablets, capsules and the like, but are also useful for coating the smaller pilules, small bead-like objects, that are usually enclosed, in a predetermined amount, within a capsule for administration.

Broadly, the principal film-forming ingredient of the present invention comprises hydrolyzed styrene-maleic anhydride copolymer which is more than 70% hydrolyzed. The copolymer can be modified to a minor extent by the presence of some other homopolymerizable ethylenic unit, such as that of acrylonitrile, acrylic acid, methacrylic acid, itaconic acid, vinyl chloride, vinylidene chloride, and the like. As used in the present specification hydrolyzed styrene-maleic anhydride copolymer is meant to include such modifications as well as modifications in the structure and method of preparation which do not alter the essential resinous nature, toxicity and acid properties of the copolymer.

Essentially the copolymers of the present invention can be represented by the following formula:

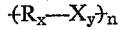

wherein R represents homopolymerizable ethylenic units of which more than 70% are styrene units (the other ethylenic units being those of acrylonitrile, acrylic acid, methacrylic acid, itaconic acid, vinyl chloride, vinylidene chloride, and the like), X represents ethylenic units of maleic acid and maleic anhydride of which more than 50% are maleic acid units (preferably more than 70%), and $x/y$ equals about one (preferably from 1 to about 1.2). The average molecular weight of the copolymer ranges from about 20,000 to about 1,500,000.

Styrene-maleic anhydride copolymer is a commercially available compound. It can be obtained, for example, from the Koppers Company, Inc., in an unmodified form. Resin SC–2 is sold by the Monsanto Chemical Company and is a modified styrene-maleic anhydride copolymer. These copolymers are hydrolyzed to obtain a styrene-maleic acid copolymer which is useful as a coating material in the present invention. The hydrolysis can be partial or it can be complete and involves a conversion of the acid anhydride linkages to α-dicarboxylic acid units. It is preferred that the hydrolysis be substantially complete, i.e., more than about 70% complete.

E. I. du Pont de Nemours and Company (Grasselli Chemicals Department) sells a product called "G–942" tanning agent, which is a partial sodium salt of a hydrolyzed styrene-maleic anhydride copolymer in a 25% water solution. This solution can be used as such; but it is preferred to use the free acid form which can be obtained by precipitation with acid, such as sulfuric or hydrochloric acid, washing the precipitate with water, and drying the product in an oven at 60° C. or in vacuo at room temperature.

Further description of the copolymer, its preparation, and properties can be found in U.S. Patent No. 2,897,121 and the references cited therein.

It is to be understood that, in its broader aspects, the present invention relates to hydrolyzed styrene-maleic anhydride copolymer which is more than 70% hydrolyzed. It includes the material described no matter how it is produced or how it is modified as long as the structure of the copolymer is primarily that of hydrolyzed styrene-maleic anhydride copolymer of the indicated properties and structure.

The hydrolyzed styrene-maleic anhydride copolymer can be from about 10 to about 75% w./w. of the coating with from about 15 to about 60% w./w. preferred.

The second principal film-forming ingredient is hydroxyethylcellulose. Hydroxyethylcellulose is available in a variety of forms which differ in the degree of viscosity imparted to aqueous solutions of identical concentration. The forms may be described as being low viscosity (less than 100 cps.), medium viscosity, and high viscosity (greater than 1500 cps.). Satisfactory coating compositions can be prepared using any of the various forms or mixtures thereof. It is possible to prepare coating solutions with higher solids content from the low viscosity forms than from the high viscosity forms and still maintain the fluidity required for coating purposes, therefore, the low viscosity forms are preferred as the solutions with higher solids content permit the formation of a coating in a lesser number of applications than is required by solutions with a low solids content. The hydroxyethylcellulose can be from about 25 to about 90% w./w. of the coating with from about 40 to 80% w./w. being preferred.

A preferred adjuvant to be included in the coating is a plasticizer in a concentration of up to 40% w./w., with from 10 to 30% w./w. being preferred. The preferred plasticizer is polyethylene glycol 400, although other plasticizers such as the 200, 300, 600, 1000, and 1500 grades of polyethylene glycol can be used as well as propylene glycol and lecithin.

Additional adjuvants which can be added are coloring agents such as the non-toxic dyes, lakes, and pigments which have been certified for use in the food, drug and cosmetic industry; flavoring agents to impart a pleasant taste, such as peppermint oil, oil of wintergreen, licorice, and spearmint; sweetening agents such as saccharin and sodium cyclamate; opacifiers such as titanium dioxide.

The compositions are prepared by dissolving the hydrolyzed styrene-maleic anhydride copolymer, hydroxyethylcellulose, and the selected adjuvants in a suitable volatile solvent or preferably, in a system of two or more miscible co-solvents. In the preferred co-solvent system a solution is prepared of the hydrolyzed styrene-maleic acid and one co-solvent such as methanol, ethanol, dioxane, acetone and methyl ethyl ketone, and mixed with a solution of hydroxyethylcellulose and the second co-solvent, such as water, chloroform, methylene chloride, ethylene dichloride, ethylene dibromide, benzyl alcohol, ethylene chlorohydrin formamide, and benzene. When the two solutions of the co-solvents are mixed the remaining ingredients such as plasticizers and colors can be added. The compositions are then ready for application to the solid medicinal dosage forms.

The coatings can be applied using conventional coating apparatus and procedure. For example, tablets can be placed in a standard rotating coating pan and the coating composition can be sprayed onto the tablets or poured over the tumbling tablets from a ladle. Applications of the coating composition can be made from time to time. Removal of the volatile solvents can be facilitated by means of a current of warm air being blown into the pan.

An alternative method of application is the air suspension method. This method and the appropriate apparatus is illustrated by Wurster in U.S. Patent No. 2,799,241 and in the J. A. Ph. A., Scientific Edition, August 1959, at page 451. By this method tablets or other solids are suspended and tumbled in a current of air with the coating composition being blown into the system.

The following examples are illustrative of the processes and products of this invention and are not to be construed as limiting.

PREPARATION 1

*Isolation of Styrene-Maleic Anhydride Copolymer*

Styrene-maleic anhydride copolymer
 (Du Pont G-942 tanning agent)_____kg__ 20
Sulfuric acid, C. P._____liter__ 1
Deionized water_____gal__ 10

The copolymer is placed in a mixer and stirred during the slow addition of the sulfuric acid over a period of 90 minutes. The mixture is stirred for 30 minutes after the addition of acid and the 5 gal. of water are added and stirred for an additional 30 minutes. The copolymer is removed by filtration, washed with an additional 5 gal. of water. The copolymer is then removed by filtration, dried in an air dryer for 120 hours at 30–35° C., and then ground to a coarse powder in which form it is suitable for use in the following examples.

EXAMPLE 1

240 gm. of hydroxyethylcellulose, low viscosity, is wetted with 800 cc. of anhydrous 3A alcohol. With stirring, 1200 cc. of water is added, and stirring is continued until all of the hydroxyethylcellulose is in solution. The hydroxyethylcellulose solution is added to 1946 cc. of anhydrous 3A alcohol solution of 360 gm. of copolymer. Sufficient anhydrous 3A alcohol and chloroform, 1:1, is added to make 6000 cc. To 2000 cc. of this is added 40 gm. of polyethylene glycol 400. The resulting solution has the following composition:

| | Total w./w. percent nonvolatile solids |
|---|---|
| Hydrolyzed styrene-maleic anhydride copolymer___ | 50 |
| Hydroxyethylcellulose, low viscosity_____ | 33.3 |
| Polyethylene glycol 400_____ | 16.7 |

This anhydrous syrup is sprayed onto 3.5 kg. of tablets by the air suspension method.

EXAMPLE 2

420 gm. of hydroxyethylcellulose, low viscosity, is wetted with 2500 cc. of anhydrous 3A alcohol. With stirring, 1500 cc. of water is added and stirring continued until the hydroxyethylcellulose is dissolved. To this solution is added 750 cc. of 3A alcohol solution of 180 gm. of copolymer. Sufficient anhydrous 3A alcohol is added to make 6000 cc., and then sufficient 80% aqueous 3A alcohol is added to make 10,000 cc.

To 2500 cc. of the above solution is added 60 cc. of polyethylene glycol 400. The resulting solution has the following composition:

| | Total w./w. percent nonvolatile solids |
|---|---|
| Hydrolyzed styrene-maleic anhydride copolymer, 1.8% w./v.=1.8% w./v._____ | 20.7 |
| Hydroxyethylcellulose, low viscosity, 4.2% w./v. =4.2% w./v._____ | 43.2 |
| Polyethylene glycol 400, 2.4% v./v.=2.7% w./v.___ | 31.2 |

This syrup is applied to 3.5 kg. of tablets by the air suspension method.

EXAMPLE 3

420 gm. of hydroxyethylcellulose, medium viscosity, is wetted with 3500 cc. of anhydrous 3A alcohol. 1000 cc. of water and 3000 cc. of chloroform are added and stirred until dissolved. To this solution is added 750 cc. of a 3A alcohol solution containing 180 gm. of copolymer. Sufficient anhydrous 3A alcohol is added to make 10,750 cc. To each 3000 cc. is added 72 cc. of polyethylene glycol 400. The resulting solution has the following composition:

| | Total w./w. percent nonvolatile solids |
|---|---|
| Hydrolyzed styrene-maleic anhydride, 1.67% w./v. =1.67% w./v._____ | 20.2 |
| Hydroxyethylcellulose, 3.90% w./v.=3.90% w./v.__ | 47.2 |
| Polyethylene glycol 400, 2.40% v./v.=2.70% w./v.__ | 32.6 |

The composition is applied to 3.5 kg. of tablets by the air suspension method.

EXAMPLE 4

420 gm. of hydroxyethylcellulose, medium viscosity, are wetted with 2700 cc. of anhydrous alcohol and then dissolved in 1700 cc. of water. To the solution is added 270 cc. (304 gm.) of polyethylene glycol 400 and 750 cc. of anhydrous ethanol containing 180 gm. of hydrolyzed styrene-maleic anhydride copolymer. Sufficient chloroform is added to make 7700 cc. of coating solution. The resulting solution has the following composition:

| | Total w./w. percent nonvolatile solids |
|---|---|
| Hydroxyethylcellulose, medium viscosity_____ | 46.4 |
| Polyethylene glycol 400_____ | 33.7 |
| Hydrolyzed styrene-maleic anhydride copolymer__ | 19.9 |

1700 gm. of the above solution is diluted with an equal volume of anhydrous 3A alcohol and sprayed onto 2500 tablets rotating in a coating pan. Each tablet is coated with 40.8 mg. of coating material.

EXAMPLE 5

A coating composition is prepared as follows. A solvent system is prepared of anhydrous 3A alcohol 64% w./w., water 22% w./w., and chloroform 14% w./w. 75.6 gm. of hydroxyethylcellulose, medium viscosity; 75.6 gm. of hydrolyzed styrene-maleic anhydride copolymer; and 71.4 gm. of polyethylene glycol 400 are dissolved in a sufficient amount of the solvent system to make 4200 cc. of coating composition.

This composition was applied to 3.5 kg. of tablets by the air suspension method. 26.5 mg. of coating was applied per tablet.

The disintegration time (U.S.P. XV) in simulated gastric juice was found to be 22 minutes.

EXAMPLE 6

A coating composition is prepared as follows. A solvent system is prepared of anhydrous 3A alcohol 77% w./w., and water 33% w./w. 45 gm. of hydroxyethylcellulose, low viscosity; 105 gm. of hydrolyzed styrene-maleic anhydride copolymer; and 60 gm. of polyethylene glycol 400 are dissolved in a sufficient amount of the solvent system to make 2500 cc. of a coating composition.

This composition was applied to 3.5 kg. of tablets by the air suspension method. 30.4 mg. of coating was applied per tablet.

The disintegration time (U.S.P. XV) in simulated gastric juice was found to be 22 minutes. In pH 7.5 buffer the disintegration time was 4 minutes.

EXAMPLE 7

A coating composition is prepared as follows. A solvent system is prepared of anhydrous 3A alcohol 54% w./w., chloroform 14% w./w., and water 32% w./w. 43.4 gm. of hydroxyethylcellulose, medium viscosity; 26.04 gm. of hydrolyzed styrene-maleic anhydride copolymer; and 27.44 gm. of polyethylene glycol 400 are dissolved in a sufficient amount of the solvent system to make 2800 cc. of a coating composition.

This composition was applied to 3 kg. of tablets by the air suspension method. 10.2 mg. of coating was applied per tablet.

The disintegration time (U.S.P. XV) in simulated gastric juice was found to be 25 minutes.

EXAMPLE 8

Coating compositions of the present invention are prepared from the following types and amounts of ingredients.

(A)

| | Gm. |
|---|---|
| Hydroxyethylcellulose | 9 |
| Hydrolyzed styrene-maleic anhydride coupolymer | 1 |
| Ethanol | 600 |
| Water | 400 |

(B)

| | |
|---|---|
| Hydroxycellulose | 2.5 |
| Hydrolyzed styrene-maleic anhydride copolymer | 7.5 |
| Ethanol | 640 |
| Chloroform | 140 |
| Water | 220 |

(C)

| | |
|---|---|
| Hydroxyethylcellulose | 8 |
| Hydrolyzed styrene-maleic anhydride copolymer | 1.5 |
| Polyethylene glycol 1500 | .5 |
| Ethanol | 600 |
| Water | 400 |

(D)

| | |
|---|---|
| Hydroxyethylcellulose | 4 |
| Hydrolyzed styrene-maleic anhydride copolymer | 6 |
| Ethanol | 640 |
| Chloroform | 140 |
| Water | 220 |

What is claimed is:

1. A solid medicinal dosage form surrounded by a coating consisting essentially of from about 25 to about 90% w./w. of hydroxyethylcellulose and from about 10 to about 75% w./w. of hydrolyzed styrene-maleic anhydride copolymer wherein said hydroxyethylcellulose and hydrolyzed styrene-maleic anhydride copolymer are homogeneously intermixed.

2. The composition of claim 1 having up to 40% w./w. of a plasticizer homogeneously intermixed in the coating.

3. A tablet surrounded by a coating consisting essentially of from about 25 to about 90% w./w. of hydroxyethylcellulose and from about 10 to about 75% w./w. of hydrolyzed styrene-maleic anhydride copolymer wherein said hydroxyethylcellulose and hydrolyzed styrene-maleic anhydride copolymer are homogeneously intermixed.

4. The composition of claim 3 having up to 40% w./w. of a plasticizer homogeneously intermixed in the coating.

5. A granule surrounded by a coating consisting essentially of from about 25 to about 90% w./w. hydroxyethylcellulose and from about 10 to about 75% w./w. of hydrolyzed styrene-maleic anhydride copolymer wherein said hydroxyethylcellulose and hydrolyzed styrene-maleic anhydride copolymer are homogeneously intermixed.

6. The composition of claim 5 having up to 40% w./w. of a plasticizer homogeneously intermixed in the coating.

7. A pilule surrounded by a coating consisting essentially of from about 25 to about 90% w./w. of hydroxyethylcellulose and from about 10 to about 75% w./w. of hydrolyzed styrene-maleic anhydride copolymer wherein said hydroxyethylcellulose and hydrolyzed styrene-maleic anhydride copolymer are homogeneously intermixed.

8. The composition of claim 7 having up to 40% w./w. of a plasticizer homogeneously intermixed in the coating.

References Cited in the file of this patent

UNITED STATES PATENTS

| | | |
|---|---|---|
| 2,685,537 | Dunmire | Aug. 3, 1954 |
| 2,693,436 | Spradling | Nov. 2, 1954 |
| 2,719,093 | Voris | Sept. 27, 1955 |
| 2,740,723 | Voris | Apr. 3, 1956 |
| 2,798,838 | Robinson | July 9, 1957 |
| 2,799,241 | Wurster | July 16, 1957 |
| 2,809,120 | Sloan | Oct. 8, 1957 |
| 2,809,192 | Sloan | Oct. 8, 1957 |
| 2,814,570 | Sloan | Nov. 26, 1957 |
| 2,814,618 | Sloan | Nov. 26, 1957 |
| 2,814,619 | Sloan | Nov. 26, 1957 |
| 2,816,062 | Doerr et al. | Dec. 10, 1957 |
| 2,843,583 | Voris | July 15, 1958 |
| 2,879,268 | Jullander | Mar. 24, 1959 |
| 2,887,440 | Greminger | May 19, 1959 |
| 2,897,121 | Wagner | July 28, 1959 |
| 2,948,626 | Saunders | Aug. 9, 1960 |
| 2,954,323 | Endicott et al. | Sept. 27, 1960 |
| 2,991,226 | Millar et al. | July 4, 1961 |
| 3,016,308 | Macaulay | Jan. 9, 1962 |
| 3,043,747 | Long | July 10, 1962 |
| 3,043,782 | Jensen | July 10, 1962 |
| 3,081,233 | Enz et al. | Mar. 12, 1963 |

FOREIGN PATENTS

| | | |
|---|---|---|
| 561,936 | Canada | Aug. 19, 1958 |
| 109,438 | Australia | Jan. 11, 1940 |

OTHER REFERENCES

Gross et al.: "Transformulating to Filmcoating," Drug & Cosmetic Industry, vol. 86 (No. 2), pp. 170–171, 264, 288–291, February 1960.

Whistler et al.: "Industrial Gums, Polysaccharides, and Their Derivatives," copyright Aug. 4, 1959, Academic Press, Inc., N.Y., pp. 1–3, entry: "Factors Influencing Gum Costs and Applications."